United States Patent
Hung

(10) Patent No.: US 8,319,881 B2
(45) Date of Patent: Nov. 27, 2012

(54) IMAGE CAPTURE SYSTEM WITH ADJUSTMENT MECHANISM

(75) Inventor: Chun-Hui Hung, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 126 days.

(21) Appl. No.: 13/029,092

(22) Filed: Feb. 16, 2011

(65) Prior Publication Data
US 2012/0169921 A1  Jul. 5, 2012

(30) Foreign Application Priority Data

Dec. 29, 2010  (TW) ................................ 99146518 A

(51) Int. Cl.
*H04N 5/225* (2006.01)
(52) U.S. Cl. ....................................... 348/340; 348/375
(58) Field of Classification Search .......... 348/373–376, 348/211.14, 369, 340, 360; 396/419, 424, 396/428
See application file for complete search history.

(56) References Cited

U.S. PATENT DOCUMENTS

| | | | |
|---|---|---|---|
| 5,808,679 A * | 9/1998 | Shih | 348/335 |
| 6,707,619 B1 * | 3/2004 | Okuno | 359/694 |
| 2005/0237637 A1 * | 10/2005 | Lung | 359/819 |
| 2008/0079847 A1 * | 4/2008 | Kung et al. | 348/373 |
| 2010/0073555 A1 * | 3/2010 | Li et al. | 348/376 |
| 2010/0266271 A1 * | 10/2010 | Carlesso et al. | 396/428 |

* cited by examiner

*Primary Examiner* — Tuan Ho
*Assistant Examiner* — Zhenzhen Wu
(74) *Attorney, Agent, or Firm* — Altis Law Group, Inc.

(57) ABSTRACT

An image capture system comprises a lens module, a ball joint, and a location element. The ball joint has a spherical joint seat and a hollow socket. The top of the spherical joint seat is coupled to the lens module, and the bottom of the spherical joint seat is coupled to the hollow socket. The location element comprises a bolt, a contact plate and a threaded retainer. The location element is set in the ball joint. Through the cooperation of the threaded retainer and the bolt, the contact plate presses the spherical joint seat and the hollow socket together, thus fixing the position of the lens module. The lens module can be adjusted and rotate about multiple axes with the ball joint.

7 Claims, 3 Drawing Sheets

IMAGE CAPTURE SYSTEM WITH ADJUSTMENT MECHANISM

BACKGROUND

1. Technical Field

The present disclosure generally relates to image capture systems, and particularly to an image capture system with adjustment mechanism.

2. Description of the Related Art

Image capture systems are gaining popularity for use in cameras, video cameras, surveyors, and other devices. The image capture system mainly comprises a lens module, an image sensor, and a circuit board. The commonly used image capture system is fixed on a base and it is difficult to adjust the direction, angle, or position of the lens module, thus the range of image capture is limited. An adjustment mechanism is required for proper image capture.

What is needed, therefore, is an image capture system which can be easily adjusted, to ameliorate the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the image capture system with adjustment mechanism. Moreover, in the drawings, like reference numerals designate corresponding parts throughout the views.

DETAILED DESCRIPTION

Embodiments of an image capture system with adjusting mechanism as disclosed are described in detail here with reference to the drawings.

Figure 1:
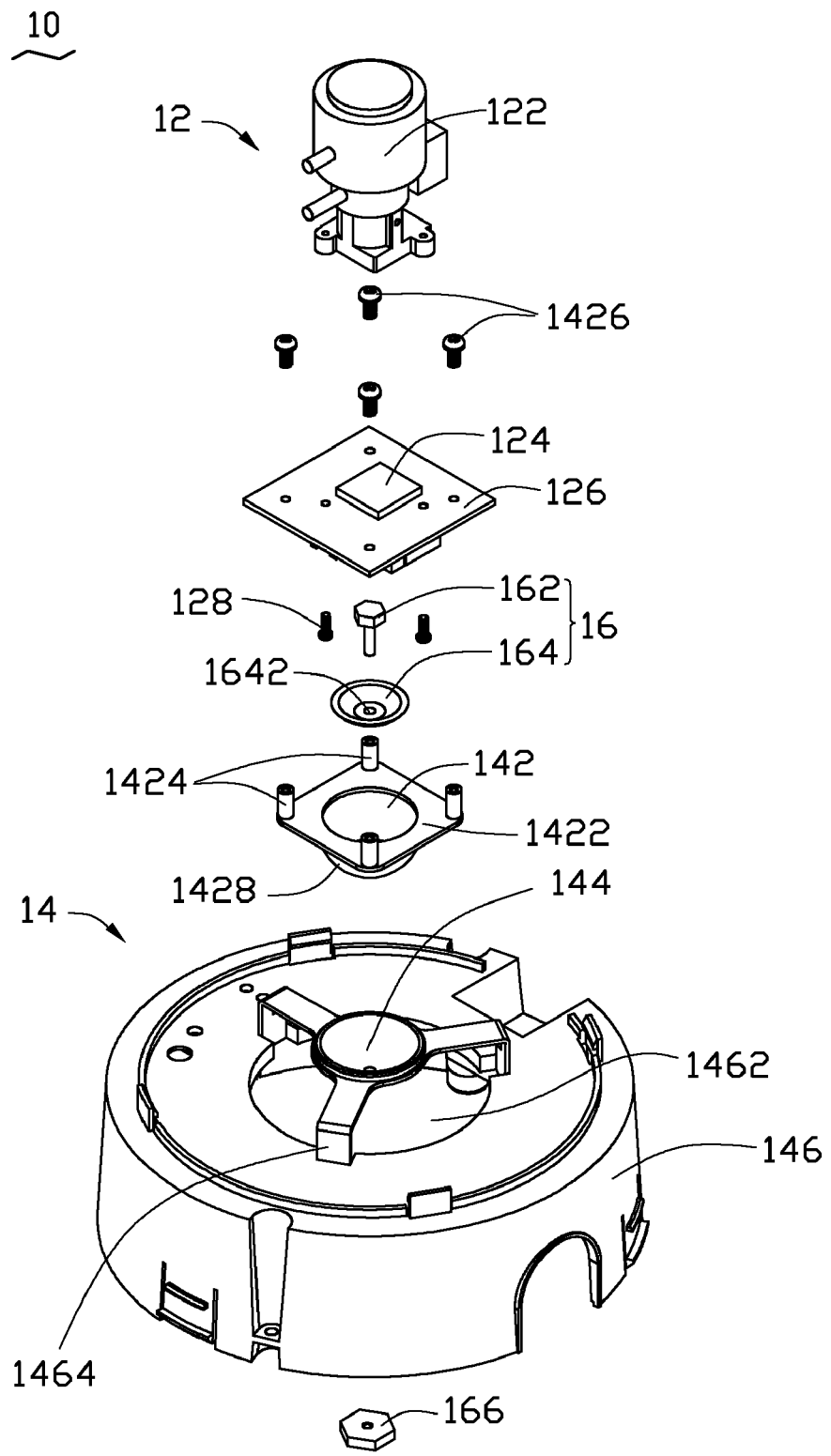
FIG. 1 is an exploded view of an image capture system with adjustment mechanism in accordance with a first embodiment.
Figure 2:
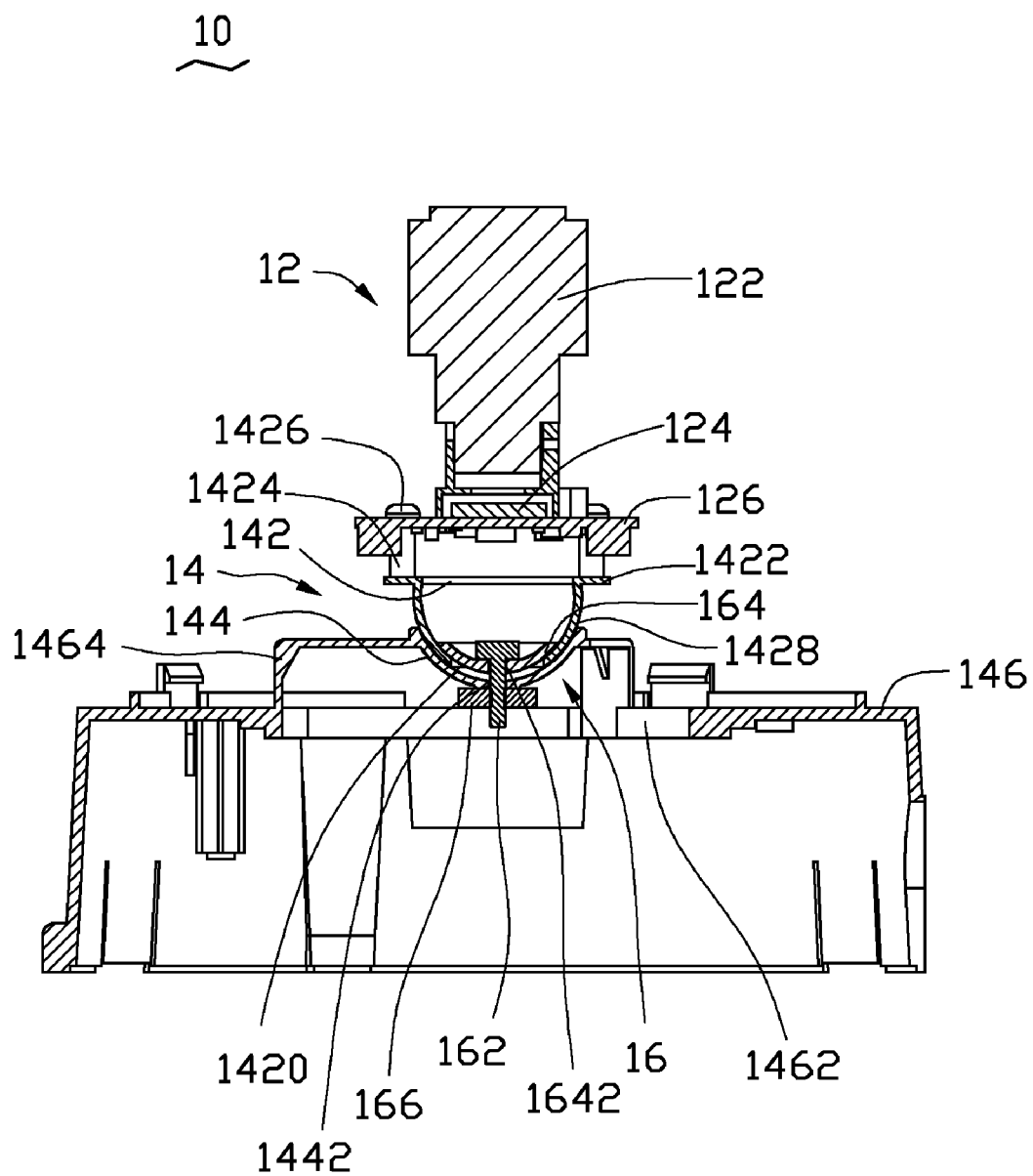
FIG. 2 is an assembly cross section of the image capture system of FIG. 1.

Referring to FIG. 1 and FIG. 2, an image capture system 10 in accordance with a first embodiment includes a lens module 12, a ball joint 14, and a location element 16. The lens module 12 includes a lens 122, an image sensor 124, and a circuit board 126. The image sensor 124 is mounted on and electrically connects to the circuit board 126. The lens 122 is arranged on the circuit board 126 by threaded fasteners 128 above the image sensor 124 with an optical axis focus on the image sensor 124. The image sensor 124 captures the image through the lens 122 for transmission through the circuit board 126.

The ball joint 14 includes a spherical joint seat 142 and a hollow socket 144. The top of the spherical joint seat 142 connects with the lens module 12. In this embodiment, the outer rim of the top of the spherical joint seat 142 includes a plate 1422 which includes a plurality of threaded receiving posts 1424 of equal height. The circuit board 126 of the lens module 12 is fixed on the threaded receiving posts 1424 of the plate 1422 by a plurality of fasteners 1426 to fix the lens module 12 on the top of the spherical joint seat 142. The bottom of the spherical joint seat 142 includes a spherical shell 1428 with a planar opening 1420 at the bottom.

The hollow socket 144 is arranged at a center of a base 146. The center of the base 146 defines a hole 1462 with a supporting frame 1464 above it. The supporting frame 1464 supports the hollow socket 144 to make the outer rim of bottom of the hollow socket 144 higher than the top surface of the base 146. The bottom of the hollow socket 144 defines a through hole 1442 corresponding to the hole 1462 at the center of the base 146 to locate the location element 16 inside the ball joint 14.

The location element 16 includes a bolt 162, a contact plate 164, and a threaded retainer 166. The contact plate 164 is a curved plate corresponding to the inner surface of the spherical shell 1428. The diameter of the contact plate 164 exceeds the diameter of the planar opening 1420 at the bottom of the spherical shell 1428. The contact plate 164 adheres to the inner surface of the bottom of the spherical shell 1428. The bottom of the contact plate 164 defines a through hole 1642 corresponding to the through hole 1442 at the bottom of the hollow socket 144 through which the bolt 162 passes. The contact plate 164 is fixed at one end of the bolt 162, and the bolt 162 extends from the inside of the spherical shell 1428 through the through hole 1642 at the bottom of the contact plate 164, the planar opening 1420 and the through hole 1442 at the bottom of the hollow socket 144 to the bottom of the hollow socket 144. The through holes 1642 and 1442 restrict the bolt 162 to the center of the bottom of the hollow socket 144. The threaded retainer 166 is at the outer rim of the bottom of the hollow socket 144 and fastens with the bolt 162. Accordingly, the spherical shell 1428 and the hollow socket 144 are fixed by the contact of the contact plate 164 to maintain the position of the lens module 12.

Figure 3:
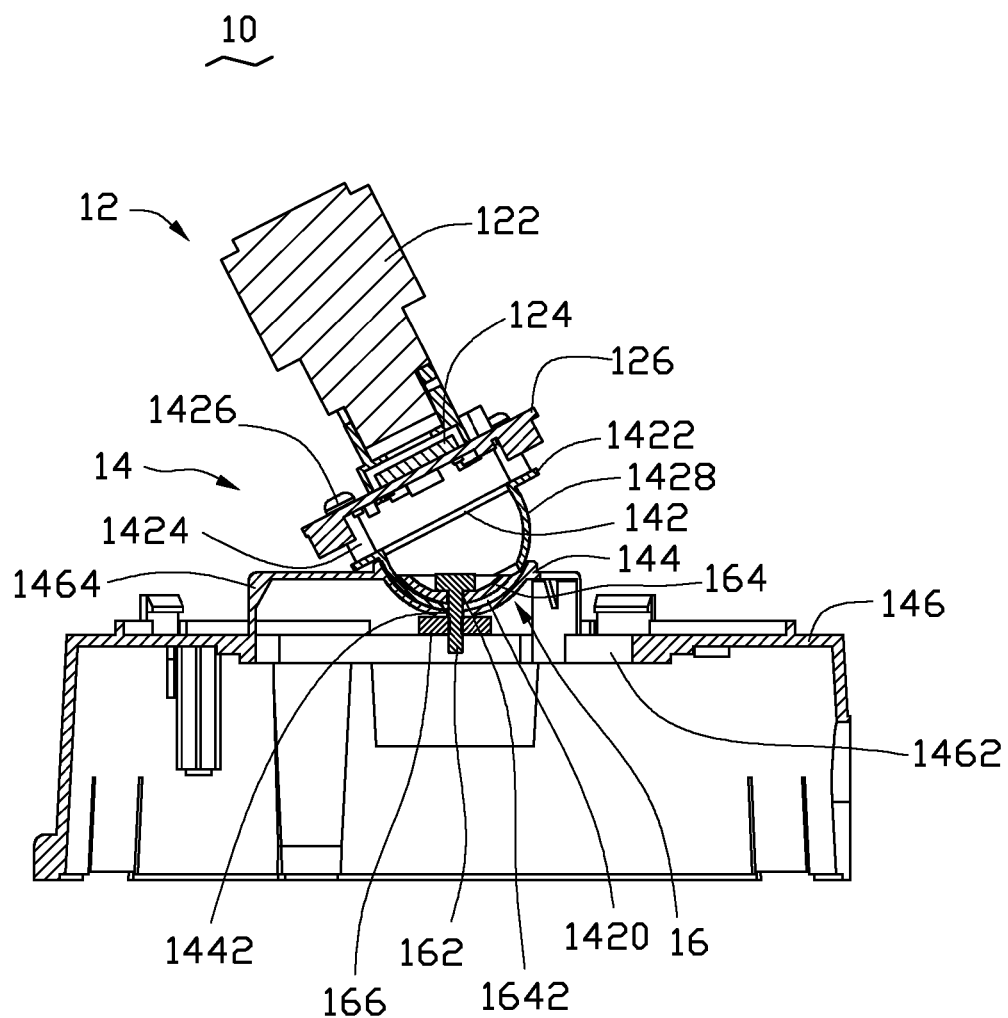
FIG. 3 is a cross section of the image capture system of FIG. 2 in an adjusted position.

Referring to FIG. 3, when the position of the lens module 12 is to be adjusted, the threaded retainer 166 can be loosened by a tool through the gap between the bottom of the hollow socket 144 and the top surface of the base 146. The spherical shell 1428 couples with hollow socket 144 allow the lens module 12 to rotate about multiple axes and through wide inclinations. The planar opening 1420 at the bottom of the spherical shell 1428 allows the lens module 12 to rotate within a cone having an apex angle of 60 degrees. The threaded retainer 166 is fastened tightly after adjustment to fix the position of the lens module 12.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An image capture system comprising:
    a lens module;
    a ball joint including a spherical joint seat and a hollow socket; and
    a location element including a bolt, a contact plate, and a threaded retainer, wherein the top of the spherical joint seat connects with the lens module, the bottom of the spherical joint seat connects with the hollow socket, the contact plate is fixed at one side of the bolt with the bolt passing through the spherical joint seat and hollow socket to fasten with the threaded retainer;
    wherein the outer rim of top of the spherical joint seat includes a plate with a plurality of threaded receiving posts for fastening the lens module.

2. The image capture system of claim 1, wherein the lens module includes a lens, an image sensor, and a circuit board.

3. The image capture system of claim 1, wherein the bottom of the spherical joint seat comprises a spherical shell with a planar opening at the bottom, the hollow socket has a corresponding through hole for the bolt passing through.

4. The image capture system of claim 1, wherein the hollow socket is arranged at the center of a base, the center of the base includes a hole, and a supporting frame is arranged at the top of the hole for supporting the hollow socket to make the bottom of the hollow socket higher than the base.

5. The image capture system of claim 3, wherein the contact plate is a curved plate corresponding to the inner surface of the spherical shell, and the diameter of the contact plate exceeds the diameter of the planar opening of the bottom of the spherical shell.

6. The image capture system of claim 5, wherein the bottom of the contact plate includes a through hole corresponding to the through hole of the hollow socket.

7. The image capture system of claim 3, wherein the threaded retainer fastens with the bolt and is arranged outside the bottom of the hollow socket.

* * * * *